April 19, 1949.　　　　　H. M. FRICKE　　　　　2,467,525
ANIMAL ENCLOSURE
Filed July 22, 1948　　　　　　　　　　　　2 Sheets-Sheet 1

INVENTOR.
HOWARD M. FRICKE
BY
Louis Necho
ATTORNEY.

Patented Apr. 19, 1949

2,467,525

UNITED STATES PATENT OFFICE 2,467,525

ANIMAL ENCLOSURE

Howard M. Fricke, Yeadon, Pa., assignor of one-half to Robert F. Alexander, Philadelphia, Pa.

Application July 22, 1948, Serial No. 40,129

2 Claims. (Cl. 119—15)

My invention relates to an animal enclosure in which relatively small animals can live.

One object of the invention is to produce an improved enclosure of the type set forth.

In medical and other experimental laboratories, it is the practice to maintain mice, rats, rabbits and other small animals, under controlled conditions so as to study hereditary, infections and contagious disorders and the effects of medicines, diets and other treatments on such disorders. The animals referred to, even when they are in good health and are living under natural conditions, are sensitive to climatic conditions and when they are subjected to drafts or abrupt or radical changes in temperature, they tend to develop colds, pneumonia, or other illnesses. When, however, these animals are purposely subjected to infection, fatigue or other privations they develop ailments of the type caused, or superinduced by, sudden, or excessive, climatic changes. Such additional ailments, obviously, vitiate the control conditions imposed for the purpose of study and thus render the experimental results obtained worthless.

It is therefore a further object of the invention to produce an improved enclosure in which experimental animals can live with full protection against drafts and abrupt variations in body temperature.

A still further object of the invention is to produce an improved enclosure in which animals may be fed and watered in a sanitary manner.

A still further object is to produce an improved enclosure which will be light, easy to clean and durable.

These and other objects are attained by my invention as set forth in the following specification and as illustrated in the accompanying drawings in which.

Figure 1:
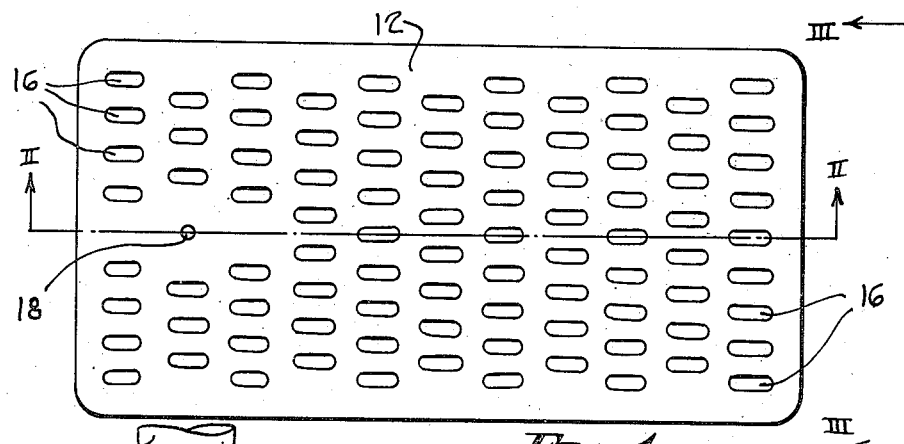
Fig. 1 is a top plan view of an animal enclosure embodying my invention, the watering bottle being omitted.

In both embodiments of the invention, 10 designates an imperforate receptacle having a bottom wall and side and end walls. The open top of the receptacle is closed by a fenestrated cover 12 having pendent flanges 14 which detachably engage the rim of the receptacle. If desired, the cover may be locked to the receptacle by any conventional means so as to prevent removal of the cover by animals in the receptacle.

The receptacle 10 is made of plastic or other material which is non-absorbent and which is a poor conductor of heat so as to protect the animals against rapid changes in body temperature. This is important because, if the receptacle is made of metal, conduction of heat to, or from the bodies of the animals will be rapid and may cause, or superinduce, colds or other diseases. If the receptacle is made of wood or other absorbent materials, it will become impregnated with excretions and other body odors. Furthermore, by making the receptacle from an available plastic, or equivalent material, it can be readily molded so as to present a continuous, round interior surface which can be easily cleaned and which the animals can not chew. To provide a receptacle made of wood with a non-absorbent, continuous, rounded inner surface will involve prohibitive costs.

The cover 12 is preferably made of any material which is light and easy to work and which has the necessary resistance. In the embodiments illustrated, the cover is made from sheet metal and is provided with openings 16 which are too small to allow a small animal, such as a small mouse, to escape.

In both embodiments of the invention, the cover 12 is provided with an opening 18 for the insertion of a glass or metal tube 20 for delivering water, or fluid nutriment, to the animals, from a bottle or the like 22. In both embodiments of the invention, the portion 24 of the cover which surrounds the opening 18 is left imperforate so as to prevent the animals from chewing the stopper 26 of the bottle.

Figure 2:
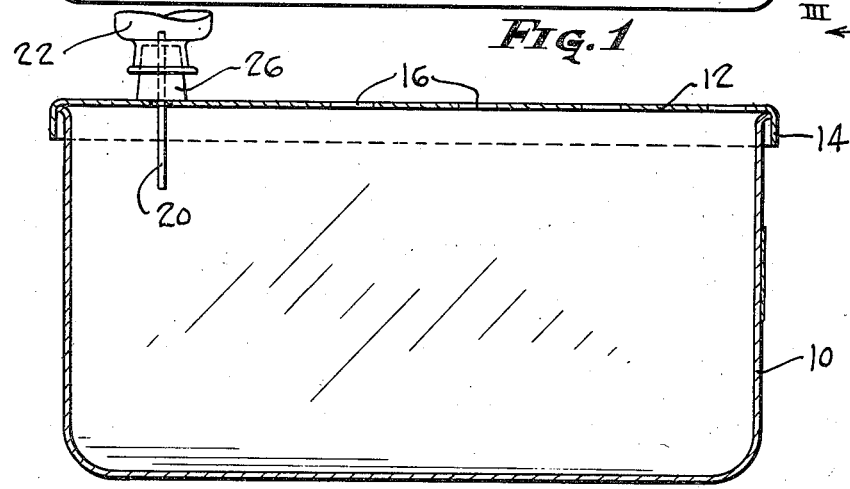
Fig. 2 is a section on line 2—2 on Fig. 1.
Figure 3:
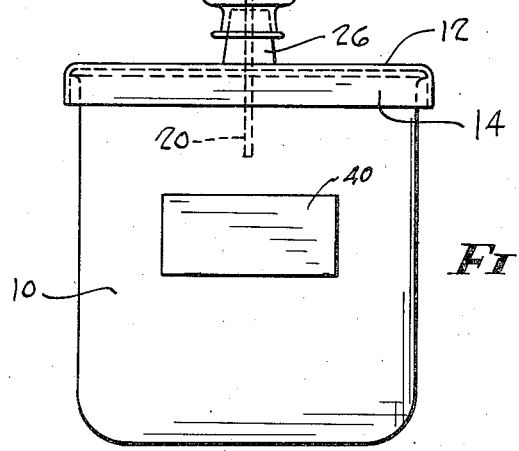
Fig. 3 is an end elevation of Fig. 2.

In the embodiment of Figs. 1 and 2, the bottle 22 is stood in inverted vertical position with the cork or rubber stopper resting on the imperforate portion 24 of the cover.

Figure 4:
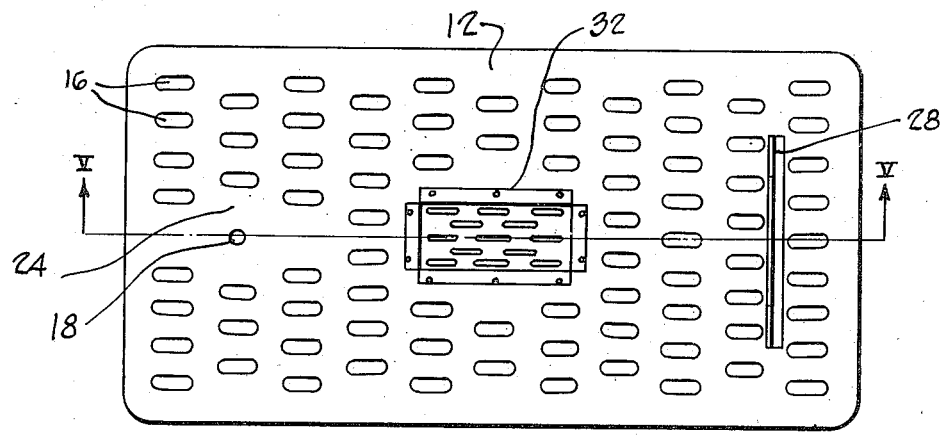
Fig. 4 is a top plan view of another embodiment of my invention.
Figure 5:
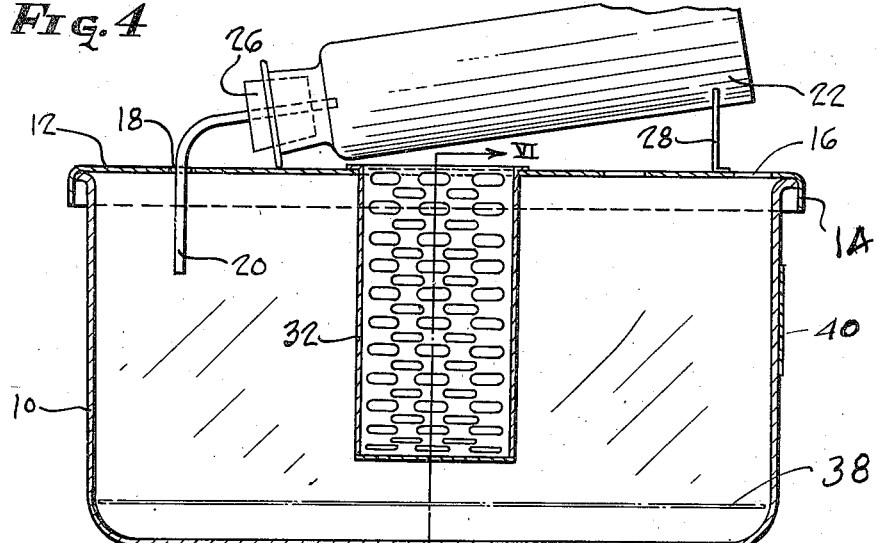
Fig. 5 is a section on line 5—5 on Fig. 4.
Figure 6:
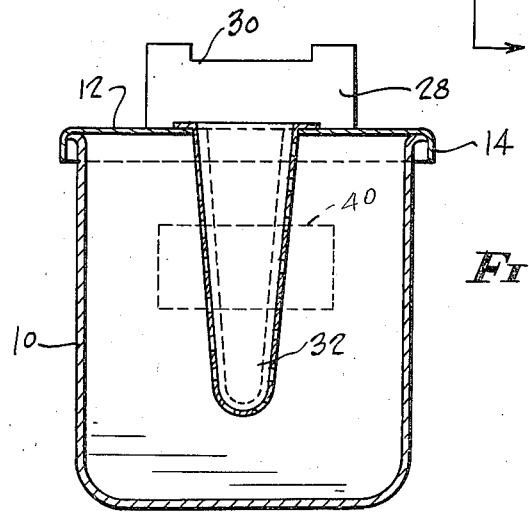
Fig. 6 is a section on line 6—6 on Fig. 5.

In the embodiment of Figs. 4 to 6, the cover 12 is provided, near one end thereof, with a stand 28, secured to or formed as part of, the cover. The stand 28 is of the desired height and serves to support the bottle 22 in an inclined position as generally shown in Fig. 5. The upper edge of the stand 28 is recessed, as at 30, to accomodate the particular shape of the bottle being used. When the structure of Figs. 4 to 6 is used, the tube 20 is bent according to the angle at which the bottle is mounted on the cover.

If desired, I also provide a fenestrated feeding basket which depends from the cover 12 as best shown in Figs. 5 and 6. This basket, which is generally referred to by numeral 32 may be made integral with the cover, or it may be secured to the underside thereof, and the openings in the walls of the basket are such as to allow the animals to reach the food placed in the basket. The top of the basket is left open so that the food supply can be replenished without having to remove the cover 12.

As will be seen from Figs. 5 and 6, the end walls of the basket are preferably left imperforate and, as shown in Fig. 6, the walls of the basket taper downwardly so as to guard against, or prevent, as much as possible, the contamination of the food in the basket by urination or defecation of the animals while they climb up and down the sides of the basket.

A screen or other fenestrated member 38, also made of a material which is a poor conductor of heat may be placed in the bottom of the receptacle, in spaced relation to the bottom wall thereof, so as to provide a clean surface for the animals to rest and exercise on.

The receptacle is preferably made of transparent or translucent material so as to permit observation of the animals therein, or to control the amount of light to which the animals are subjected.

It will thus be seen that I have produced a light, sanitary, inexpensive and practical animal enclosure in which, except for occasion cleaning, the animals can be fed, watered and observed without disturbing them in any way.

One end wall of the receptacle 10, or one side wall thereof, is provided with a writing area 40 on which the record of the current tenants of the receptacle may be kept. This writing area is of the type which permits repeated erasure, and can be produced in any well known manner. However, since the receptacle 10 is made of plastic material, the writing area 40 can be produced by cementing a patch of the same or of a different plastic material onto the wall of the receptacle, or by applying a liquid coating, or by applying heat to the wall of the receptacle.

What I claim is:

1. An animal enclosure comprising a substantially rectangular container, large enough to accommodate rats and similar animals and formed of a substantially transparent, plastic material, said container having side walls and a bottom wall and interior rounded portions connecting said walls, and a metal cover for closing the top of said container, said cover having ventilating openings in a portion of its area, and having a feed opening in an otherwise unapertured portion of its area, said cover resting freely and loosely on the rim of said container and having a pendent flange disposed adjacent the outer wall of the container near said rim to prevent movement of said cover in a horizontal plane passing through said rim.

2. The structure recited in claim 1, together with a fenestrated feed basket carried by the underside of the cover and depending into said container.

HOWARD M. FRICKE.

REFERENCES CITED

The following references are of record in the file of this patent:

UNITED STATES PATENTS

| Number | Name | Date |
|---|---|---|
| 932,086 | Allen | Aug. 24, 1909 |
| 1,159,744 | Caldwell | Nov. 9, 1915 |
| 1,553,834 | Peterson | Sept. 15, 1925 |
| 1,601,203 | Erdmann | Sept. 28, 1926 |
| 1,986,501 | Conway et al. | Jan. 1, 1935 |
| 2,151,589 | Falls | Mar. 21, 1939 |
| 2,154,152 | Devary et al. | Apr. 11, 1939 |
| D. 117,173 | Gruenberg | Oct. 17, 1939 |
| 2,177,522 | Fletcher | Oct. 24, 1939 |
| 2,241,064 | Harbeson | May 6, 1941 |
| 2,346,001 | Bate | Apr. 4, 1944 |
| 2,422,438 | Richards | June 17, 1947 |

OTHER REFERENCES

General Catalog of Laboratory Apparatus and Scientific Instruments, Central Scientific Company, Catalog J-141, printed 1941, page 666, No. 44,060.